(12) United States Patent
Semersky et al.

(10) Patent No.: US 7,292,350 B2
(45) Date of Patent: Nov. 6, 2007

(54) LASER SYSTEM FOR MEASUREMENTS OF THE PROFILE OF OBJECTS

(75) Inventors: Frank E. Semersky, Holland, OH (US); Daniel L. Witham, Holland, OH (US); Stephen K. Koskie, Maumee, OH (US)

(73) Assignee: Plastic Technologies, Inc., Holland, OH (US)

( * ) Notice: Subject to any disclaimer, the term of this patent is extended or adjusted under 35 U.S.C. 154(b) by 152 days.

(21) Appl. No.: 10/550,521

(22) PCT Filed: Mar. 24, 2004

(86) PCT No.: PCT/US2004/009123

§ 371 (c)(1),
(2), (4) Date: Sep. 22, 2005

(87) PCT Pub. No.: WO2004/086573

PCT Pub. Date: Oct. 7, 2004

(65) Prior Publication Data

US 2006/0192954 A1   Aug. 31, 2006

Related U.S. Application Data

(60) Provisional application No. 60/457,140, filed on Mar. 24, 2003.

(51) Int. Cl.
*G01B 11/24* (2006.01)

(52) U.S. Cl. .................... 356/601; 356/612; 250/458.1
(58) Field of Classification Search ............. 356/240.1, 356/601, 612; 250/458.1
See application file for complete search history.

(56) References Cited

U.S. PATENT DOCUMENTS

| | | | | |
|---|---|---|---|---|
| 4,226,539 A | * | 10/1980 | Nakagawa et al. | 356/445 |
| 4,298,285 A | | 11/1981 | Ito | |
| 4,465,937 A | * | 8/1984 | Forbes | 356/612 |
| 4,863,275 A | | 9/1989 | Cormack et al. | |
| 4,906,098 A | | 3/1990 | Thomas et al. | |
| 4,972,258 A | * | 11/1990 | Wolf et al. | 250/458.1 |
| 5,345,309 A | * | 9/1994 | Wertz et al. | 356/612 |
| 5,753,905 A | | 5/1998 | Ringlien | |

* cited by examiner

*Primary Examiner*—Gregory J. Toatley, Jr.
*Assistant Examiner*—Iyabo S Alli
(74) *Attorney, Agent, or Firm*—Fraser Clemens Martin & Miller LLC; Donald R. Fraser

(57) ABSTRACT

A system for measuring a profile of an object comprising a source creating a beam of electromagnetic energy. An electromagnetic beam receiver spaced from the source for processing an output signal proportional to the girth of the object being measured. A platform for providing rotational and vertical movement of the object being measured causing the object to obstruct a portion of the electromagnetic beam generated by the source. A processor for processing the output signal from the electromagnetic beam receiver to form a composite profile of the object measured.

20 Claims, 5 Drawing Sheets

LASER SYSTEM FOR MEASUREMENTS OF THE PROFILE OF OBJECTS

CROSS REFERENCE TO RELATED APPLICATIONS

This application claims the benefit of U.S. Provisional Patent Application Ser. No. 60/457,140 filed Mar. 24, 2003.

BACKGROUND OF THE INVENTION

1. Field of the Invention

The present invention relates to measuring systems and more particularly to a laser system for measuring the profile of an object such as a container, for example.

2. Description of the Prior Art

The prior art systems have commonly included measuring the profile of an object utilizing manually operated micrometers. This typically requires a person to make manual measurements about a perimeter of the object, read the micrometer (whether digital or inscribed), and record the measurement data accordingly. A user then manually enters the measurement data into a computer. While such systems achieve the measurement objectives, the systems consumed rather substantial quantities of time and required manual dexterity.

SUMMARY OF THE INVENTION

It is an object of the present invention to produce a system for measuring the profile of an object which is automatic.

Another object of the invention is to produce a system for measuring the profile of a plurality of objects wherein the plurality of object to be measured may be delivered and removed from the system automatically.

Another object of the invention is to produce a system for measuring the profile of an object utilizing a laser micrometer.

Still another object of the invention is to produce a system for measuring the profile of an object and determine the displacement of the top of the object from a given point and the base thereof.

Still another object of the invention is to produce a system for measuring the profile of the threaded finish portion of a container adapted to receive a threaded closure.

The above as well as other object of the invention may be achieved by a system for measuring the profile of an object comprising a source creating a beam of electromagnetic energy. An electromagnetic beam receiver spaced from the source processes an output signal proportional to the girth of the object being measured. A platform for providing rotational and vertical movement of the object being measured causes the object to obstruct a portion of the electromagnetic beam generated by the source. A processor for processing the output signal from the electromagnetic beam receiver forms a composite profile of the object measured.

BRIEF DESCRIPTION OF THE DRAWINGS

Other objects and advantages of the invention will become manifest to those skilled in the art from reading the following detailed description of an embodiment of the invention when considered in the light of the accompanying drawings, in which.

DESCRIPTION OF THE PREFERRED EMBODIMENT

Figure 1:
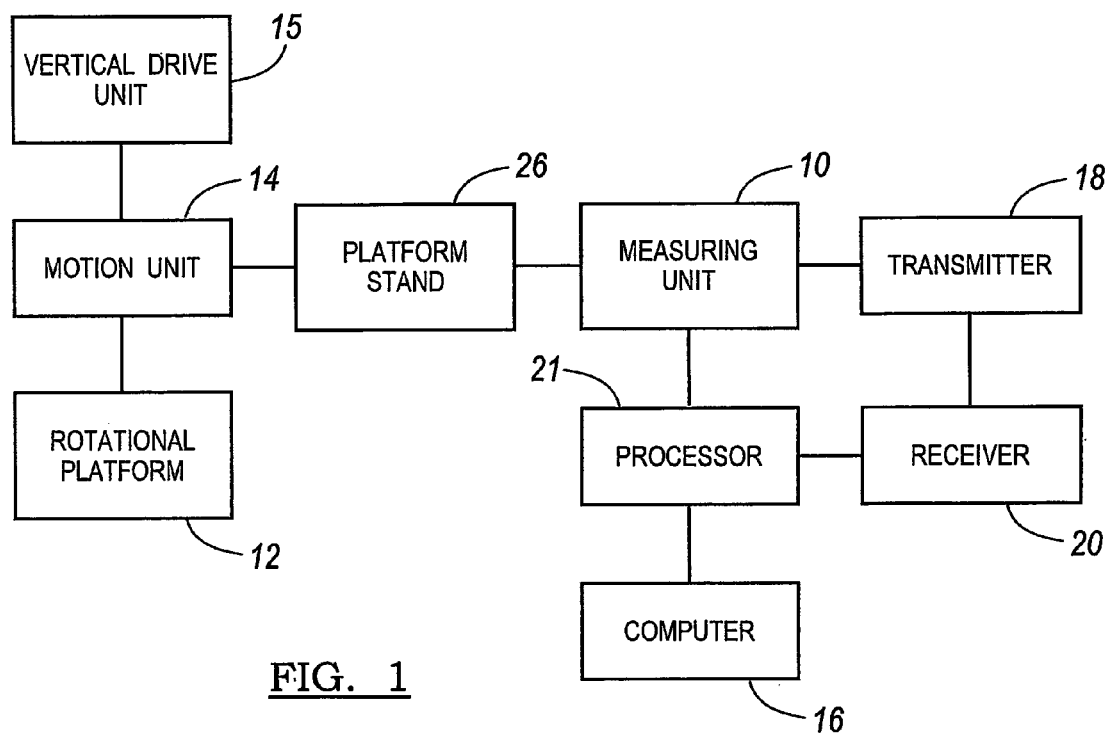
FIG. 1 is a block diagram illustrating a laser measurement system of the present invention.

Referring to the drawings, there is illustrated a measuring system for measuring the outer profile of an object. It is has been surprisingly determined that the system is particularly useful for providing a quick and simple way of obtaining the profile parameters of PET bottles, filled or empty.

The system illustrated in FIG. 1 includes a block diagram of a laser measurement system. The laser measurement system includes a measuring device 10 which is a Takikawa Laser Micrometer (Model LDM-305H), purchased through DAS Distribution, Inc. (www.dasdistribution.com). The measuring device 10 includes a laser transmitter unit 18 and a laser receiving unit 20. The laser transmitter unit 18 (i.e., source) transmits a primary beam of electromagnetic energy in the direction of the laser receiving unit 20 for profiling an object disposed within the primary electromagnetic beam. A processor 21 within the measuring device 10 processes measurement data received from the laser receiving device 20 and transmits the measurement data to a computer 16 for storage in a file. The measuring device 10 is mechanically coupled to a platform stand 26. The platform stand 26 supports the measuring device 10. A motion unit 14 is mechanically coupled to the platform stand 26 and provides vertical and rotational displacement of an object. The motion unit 14 includes a rotational platform 12 for supporting and rotating the object and a vertical drive device 15 for upwardly or downwardly moving the object positioned on a rotational platform 12. The rotational platform 12 is rotationally coupled outward from the vertical drive device 15 for supporting and rotating the object within the primary electromagnetic beam about a vertical axis. The rotational platform 12 is rotatable 360° for profiling the entire circumference of the object in a respective plane.

Figure 3:
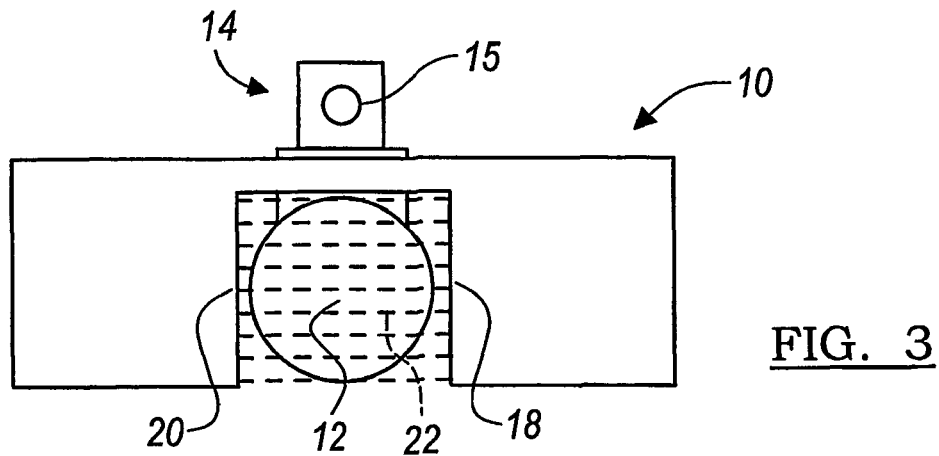
FIG. 3 is a schematic top view of a portion of the laser measurement system illustrated in FIG. 2.
Figure 2:
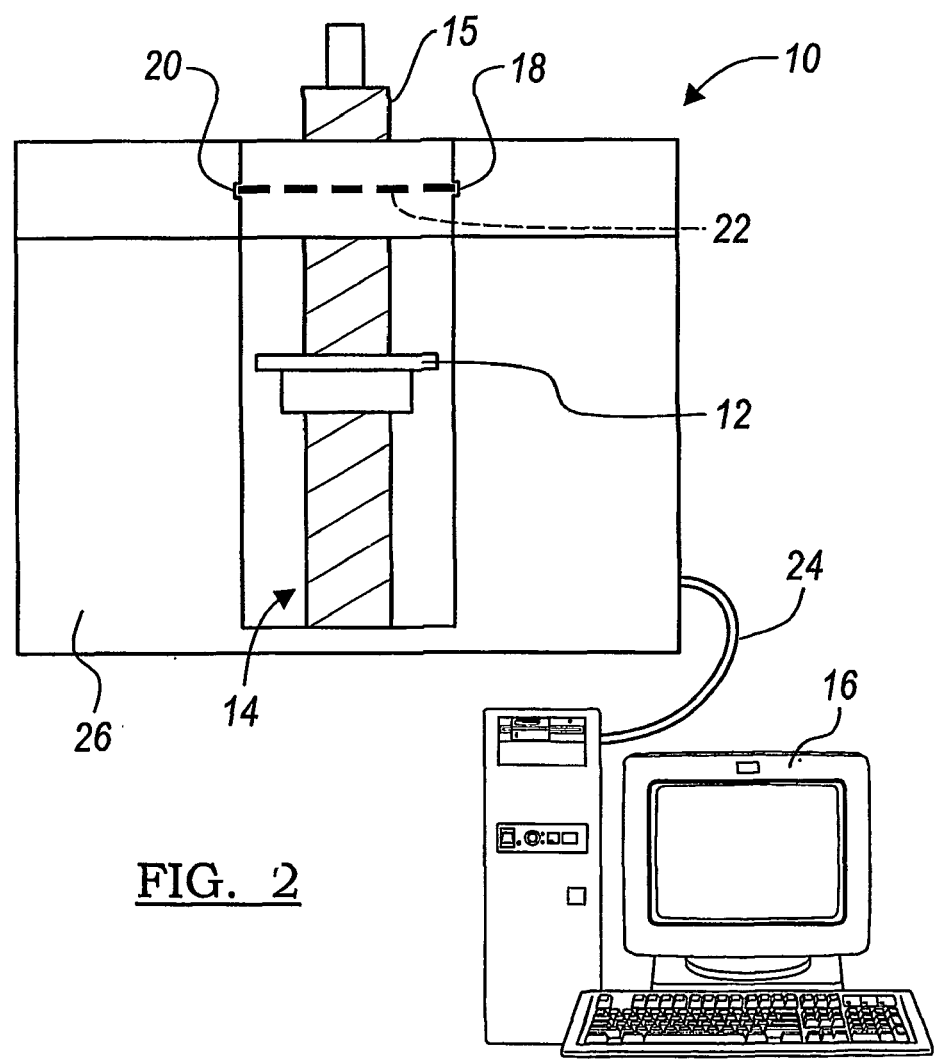
FIG. 2 is a schematic front view of a laser measurement system according to a first embodiment of the present invention.

FIG. 2 and FIG. 3 illustrate a schematic front view and top view of the laser measurement system, respectively. The platform stand 26 is affixed to a bottom surface of the measuring device 10 for supporting the measuring device 10. The measuring device 10 includes the transmitter unit 18 disposed on a first side of the measuring device 10 and a receiving unit 20 disposed on a second side of the measuring device 10. The transmitter unit 18 and the receiving unit 20 are spaced a predetermined distance apart from one another. The vertical drive unit 15 and the rotational platform 12 are disposed therebetween. The transmitting unit 18 transmits a 7" wide electromagnetic laser beam 22 (i.e., primary) in the direction of the receiving unit 20 for profiling the object. The electromagnetic laser beam 22 is a class II laser light source from a visible red semiconductor laser (670 nm) with a 1 mW maximum output. In alternative embodiments, other laser light sources may be utilized.

The measuring device 10 includes the processor 21 (shown in FIG. 1) for maintaining measurement data polled from a profiled object. The processor 21 communicates with the computer 16 via a communication line 24 (e.g., RS232 cable) for transmitting measurement data between the processor 21 and the computer 16. Alternatively, other types communication lines may be used such as a USB cable or firewire.

Figure 4:
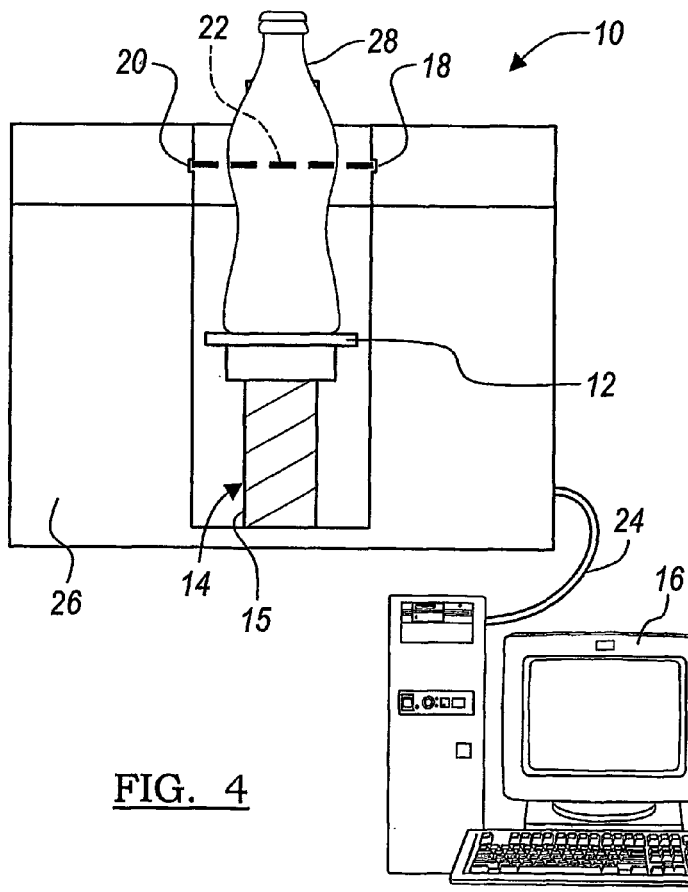
FIG. 4 is a schematic front view of a laser measurement system profiling an object.

FIG. 4 illustrates the object disposed within the laser measurement system for profiling. A plastic container 28 is disposed on the rotational platform 12. An advantage of the present invention is that the laser measurement system may profile the plastic container 28 whether filled, empty, or partially filled with a substance. The plastic container 28 may be measured prior to and after the substance has been added. This allows for statistical quality control and inspection of the plastic container 28. After the plastic container 28 is positioned on the rotational platform 12, depending on its initial position, the vertical drive unit 15 is indexed upward or downward to an initial measurement position. Software is provided for transmitting control signals to the motion unit 14 for controlling the motion of the vertical drive device 15. The software also provides control signals for controlling the rotary motion of the rotational platform 12. As a result, the software raises, lowers, and rotates the plastic container 28 to align a respective plane of the plastic container 28 with the electromagnetic laser beam 22.

The vertical drive device 15 utilizes a linear screw drive to produce the vertical displacement. The linear screw drive is rotated either clockwise or counterclockwise under software control to move the rotational platform 12 upward or downward.

When the plastic container 28 is moved between the transmitter unit 18 and the receiving unit 20, the electromagnetic laser beam 22 is obstructed thereby reducing it to two smaller beams (i.e., secondary beams). That is, the electromagnetic laser beam 22 will be split into two smaller laser beams as seen by the receiving unit 20.

Figure 5:
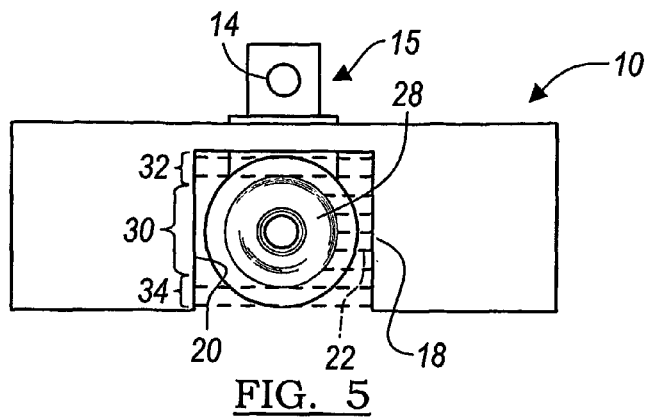
FIG. 5 is a schematic top view of a portion of the laser measurement system illustrated in FIG. 4.

FIG. 5 illustrates the splitting of the electromagnetic laser beam 22. A dark area 30 is shown generally indicating a region where no laser radiation is received by the receiving unit 20 as a result of the plastic container 28 blocking the electromagnetic laser beam 22. A first smaller beam 32 includes a portion of the electromagnetic laser beam received by the receiving unit 20 that is unobstructed by the plastic container 28. The width of the first smaller beam 32 is dependent on the obstruction of the plastic container 28 and the passage of the portion of the unobstructed electromagnetic beam from a first exterior surface of the plastic container 28 to a first adjacent edge of the electromagnetic laser beam 22. Likewise, a second smaller beam 34 received by the laser receiving unit 20 is a portion of the electromagnetic laser beam that is unobstructed by the plastic container 28. The width of the second smaller beam 34 is dependent on the obstruction of the plastic container 28 and the passage of the portion of the unobstructed electromagnetic laser beam from a second exterior surface (i.e., 180° opposite the first exterior surface) to a second adjacent edge of the electromagnetic laser beam 22. The resulting signals are received and measured by the receiving unit 20. These resulting signals include a first smaller beam 32 having a first width, a void of a darkened area 30, and a second smaller beam 34 having a second width. The profile of a respective plane of the plastic container 28 (i.e., girth) is directly proportional to the void of the darkened area 30. The profile of a respective plane of the plastic container 28 may be determined by directly measuring the void of the darkened area 30. Alternatively, the profile a respective plane of the plastic container 28 may be determined by the difference between the width of the electromagnetic laser beam 22 and the first and second smaller beams 32 and 34 received by the receiving unit 20.

Figure 6:
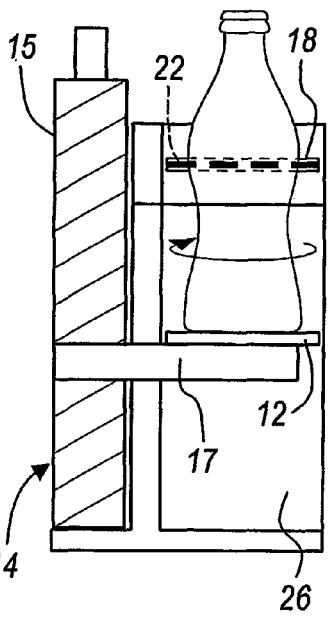
FIG. 6 is a schematic side view of a vertical and rotational motion unit according to the present invention.

The plastic container 28 may also be rotated by the rotational platform 12 for profiling at least one view within a respective plane. The rotational platform 12 includes a rotational drive device 17 for rotating the plastic container 28 supported by the rotational platform 12, as shown in FIG. 6. In the preferred embodiment, the rotational drive device 17 includes a gear driven mechanism. A motor (such as a stepper motor) may be used to drive the gears of the rotational drive unit. In another embodiment, a belt driven mechanism may be utilized to rotate the rotational platform 12. Position encoders may also be utilized for determining the rotational position of the rotational platform at any given degree of rotation. As a result, the plastic container 28 may be moved vertically to profile any respective plane and rotationally to profile a respective view.

At any point, the software can poll the position of the vertical drive unit 15 and the rotational platform 12 relative to the plane of the electromagnetic laser beam 22 and retrieve a resulting data measurement. By entering minimal initial information to the software program such as heights at which to measure, incremental degrees by which to rotate the object, and a mode in which to scan (see Bulge/Pinch infra), an object specific program can be built in a matter of seconds. After the initial information is entered, the plastic container 28 is placed on the rotational platform 12 and a scan operation is initiated. The measuring device 10 will profile the plastic container 28 given the operating parameters of the initial information entered and transmit the measurement data to a file stored in the computer 16 via the communication line 24. To scan a second plastic container of an identical size and shape, the first plastic container 28 is removed from the rotational platform 12 and the second plastic container is positioned on the rotational platform 12. The scan operation is thereafter initiated. Measurement data retrieved from each plastic container profiled is stored in one or more files in the computer 16.

The motion unit 14 is positioned relative to the measuring device 10 such that an upper bounds of the motion unit 14 places the top support surface of the rotational platform 12 flush with the plane of the electromagnetic laser beam 22. This is considered the zero reference point for all vertical motion measurements with respect to objects of this same form. Any polling by the computer 16 for position and measurement data are relative to the zero reference point.

In addition to measuring an object at a specific height and degree requested by the user, the measuring device 10 can scan a region of the object, search for the maximum (bulge) or minimum (pinch) diameter measurement in that area, and then take measurement data around the object at that location. This is advantageous to users tracking changes between an unfilled plastic container and a filled plastic container. Such measurements may be utilized for quality or statistical process control (SPC) at critical locations. Furthermore, an entire exterior surface of a plastic container may be profiled thereby creating a visual profile of the plastic container as a whole.

The preliminary information entered into the computer 16 can be saved in an object profile. The next time the object (or same formed object) is measured, the saved object profile may be retrieved and utilized for profiling as opposed re-entering the preliminary information manually by the user.

The software further has a built-in calibration feature that will calibrate the vertical motion of the laser measurement system. When an object of a known height is placed onto the rotational platform 12, the height of the object is entered into the software by the user. The software will provide commands to scan for the top of the object. The rotational platform 12 is then moved up the height of the object and re-zero the value for the vertical motion.

The present invention further has the advantage of measuring the perpendicularity of an object (i.e., a bottle). Perpendicularity is important where alignment is critical between the opening of the bottle and a filler adapter of a dispensing unit dispensing a substance into a bottle. Vertical alignment between the opening of the bottle and the filler adapter must be achieved to allow spill-free dispensing from the dispensing unit to the bottle. The object is placed on the rotational platform 12 and centered thereon. The system will then determine the displacement of the top of the object (i.e., center of the bottle opening) to the center of the table, which constitutes the measure of the perpendicularity of the object.

Furthermore, the laser measurement system may be used to measure and verify detailed information in regards to the thread finishing for proper alignment with a mating threaded end cap. The bottle is placed on the rotational platform 12 and scanned at various planes of the threaded portion for determining significant dimensional information from the finished threads. This is different from the typical measurements generated above because the threads are not in the same plane, but rather the threads spiral downward around the filler neck of the bottle. Measured thread dimensions includes a "T" dimension (i.e., thread crest diameter), an "E" dimension (i.e., thread root diameter), an "A" dimension (i.e., tamper evident bead diameter), and a "Z" dimension (i.e., maximum diameter on support ledge). Furthermore, by knowing the location of a plurality of "T" dimensions, the thread pitch is determined.

Figure 7:
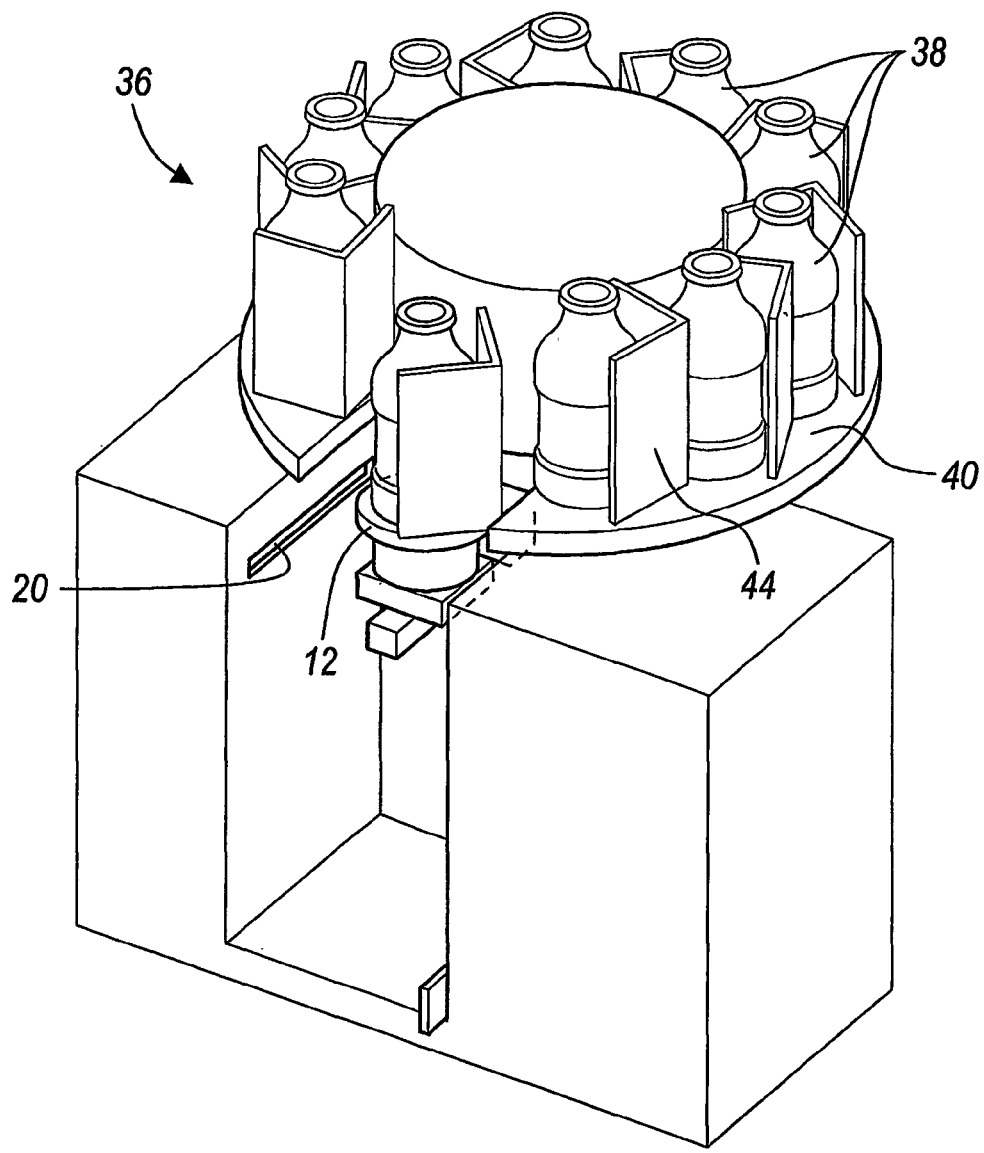
FIG. 7 is a perspective view of a carousel unit according to the present invention.

In the illustrated embodiment, the user has to manually place and remove the objects being measured in the laser measurement system. In an alternative embodiment, an indexing station is provided similar to a carousel system, as shown in FIG. 7. An indexing station shown generally at 36 is disposed above the measuring device 10. The rotational platform 12 is vertically moved to a respective position by the drive unit 15 such that the top surface of the rotational platform 12 is aligned horizontally with a stationary track floor 40 of the indexing station 36. The user would place a plurality of objects 38 on the indexing station 36. A plurality of separator guides 44 separate the plurality of objects 38 from one another. The plurality of separators guides 44 are "V-shaped" so that each of the plurality of objects 38 may be properly retained and moved along the track floor 40 while being indexed. When the scan operation is commenced, the first object is moved along the track floor 40 and displaced onto the aligned top surface of the rotational platform (i.e., loading position) by a first separator guide. The motion unit is then moved downwardly to commence profiling of the first object.

After the measurement laser system has completed profiling and retrieving measurement data from the first object, the vertical drive unit 15 moves the rotational platform 12 upward to the loading position. The indexing station is advanced, so that the first object is displaced off the top surface of the rotational platform and onto the track floor 40 by the first separator guide. A second object is simultaneously moved along the track floor 40 and is displaced onto the top surface of the rotational platform 12 by a second separator guide. The second object is thereafter vertically moved and rotated for retrieving measurement data. The software controls the indexing of indexing station 44 so that each of the plurality of objects 38 are profiled and measurement data retrieved. Measurement data from each profiled object will be stored in a same file for data processing and retrieval. Alternatively measurement data may be stored in a plurality of files.

Figure 8:
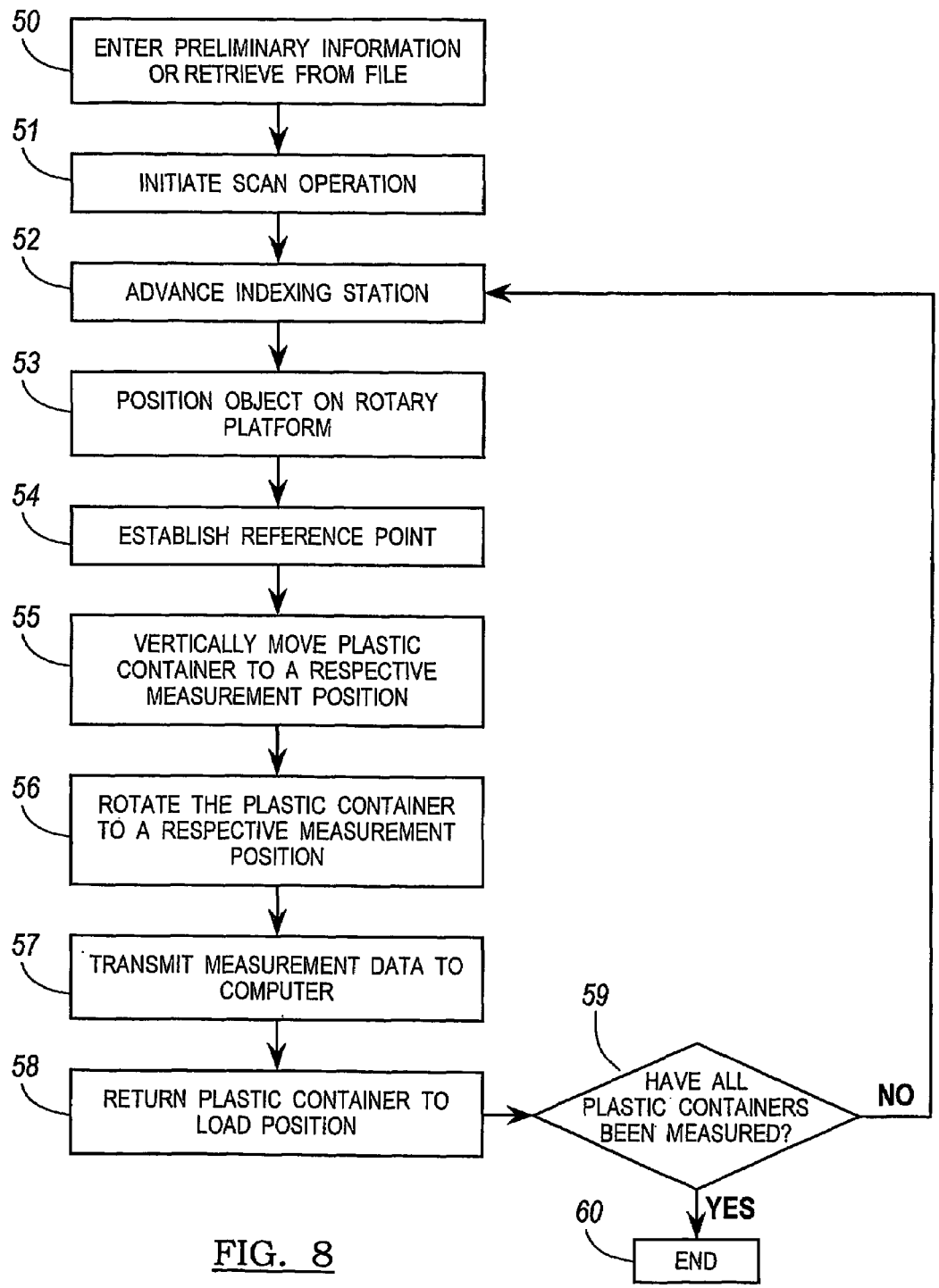
FIG. 8 is a flowchart illustrating a method for profiling a plurality of objects using a laser measurement system.

FIG. 8 illustrates a method for measuring an object using the laser measurement system. In step 50, data is entered into a computer software program containing the preliminary information of the plastic container. Such preliminary information may include height of the object, heights and locations which to measure, incremental degrees by which to rotate the object, scan mode, and the number of objects to profile. If the preliminary information for a respective object has been previously entered and stored, the preliminary information may be directly retrieved from a stored file in the computer's memory. After the preliminary information is manually entered by the user or retrieved from the stored file, a scan operation is initiated in step 51. In step 52, the indexing unit is advanced. A respective separator guide guides a respective plastic container onto the top surface of the rotational platform. Proximity sensors may be positioned in the indexing unit for determining the presence of a plastic container on the rotational platform to commence profiling. In step 53, optional tooling may be used to center the plastic container on the top surface of the rotational platform, if desired.

In step 54, the zero reference point is established by vertically descending the rotational platform to the position where the bottom plane of the plastic container is inline and obstructing the electromagnetic laser beam. In step 55, the plastic container is vertically moved to at least one vertical position as predetermined from the preliminary information entered into the software program. In step 56, the plastic container is rotated a respective number of degrees for profiling at least one respective view within a respective plane. In step 57, the measurement data of a respective profile is transmitted to the computer via a communication line and stored in a file.

In step 58, the plastic container is returned to the load position. In step 59, a determination is made whether all of the plastic containers have been profiled by the laser measurement system. The software programs keeps track of whether all plastic containers have been profiled based on a number of plastic containers entered as part of the preliminary information for profiling versus the number of times the indexing table is indexed. If the determination is made in step 59 that more plastic containers require profiling, a return is made to step 52 to advance the indexing unit for profiling of the next plastic container. If the determination is made in step 59 that all plastic containers have been profiled, then the scan operation is terminated in step 60.

From the above description, it will be apparent that the described and illustrated system has produced a quick and simple method and apparatus for measuring the outer profile of an object. The system has been found to be particularly useful for measuring PET bottles, empty or filled, as well as preforms and associated tooling.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A system for measuring the profile of an object comprising:

a source creating a primary laser beam of electromagnetic energy;

an electromagnetic laser beam receiver spaced from said source for processing an output signal proportional to the girth of said object being measured, the output signal consisting of measurement data of at least one secondary laser beam formed from a portion of the primary laser beam unobstructed by the object;

a platform for providing rotational and vertical movement of said object being measured causing said object to obstruct a portion of said electromagnetic laser beam generated by said source; and a processor for processing said output signal from said electromagnetic laser beam receiver to form a composite profile of said object measured.

2. The system of claim 1 further comprising a motion unit for providing said rotation and vertical movement.

3. The system of claim 2 wherein said motion unit includes a vertical drive device for vertically displacing said platform.

4. The system of claim 3 where said vertical drive device includes a linear screw drive.

5. The system of claim 2 wherein said motion unit includes a rotational drive device for rotationally displacing said platform.

6. The system of claim 1 wherein said vertical drive device includes a gear driven mechanism.

7. The system of claim 1 further comprising an indexing station for providing a plurality of objects to said platform, said indexing station automatically positions a respective object on said platform.

8. The system of claim 1, wherein said primary electromagnetic laser beam is generated by a class II laser light source.

9. The system of claim 8 wherein said laser light source is a visible red light source.

10. The system of claim 9 wherein said visible red light source includes a wavelength of 670 nanometers.

11. A system for measuring the profile of an object comprising:

a source creating a primary laser beam of electromagnetic energy;

an electromagnetic laser beam receiver spaced from said source for processing an output signal proportional to the girth of said object being measured, the output signal consisting of measurement data of at least one secondary laser beam formed from a portion of the primary laser beam unobstructed by the object;

a platform for supporting said object;

a motion unit for providing rotational and vertical movement of said platform for disposing said object within said electromagnetic laser beam of energy, wherein said object obstructs a portion of said electromagnetic laser beam generated by said source; and a processor for processing said output signal from said electromagnetic laser beam receiver to form a composite profile of said object measured.

12. A method for measuring the profile of an object comprising the steps of:

positioning said object on a plafform of a motion unit;

providing a source for generating a primary laser beam of electromagnetic energy of a predetermined width;

vertically and rotationally disposing said object within said primary laser beam of electromagnetic energy using said vertical motion unit, said object obstructing a portion of said primary laser beam of electromagnetic energy;

receiving at least one secondary electromagnetic laser beam of energy within a receiving unit disposed opposite of said source, the secondary electromagnetic laser beam formed from a portion of the primary laser beam unobstructed by the object, said at least one secondary electromagnetic beam of energy having a smaller width than said primary laser beam; and processing an output signal proportional to a girth of said object being measured to form a composite profile of said object measured, said processing step consisting of measuring the at least one secondary electromagnetic laser beam and determining the difference between the width of the primary laser beam of electromagnetic energy and a width of the at least one secondary electromagnetic laser beam.

13. The method of claim 12 wherein said object is vertically positioned within said primary beam of electromagnetic energy by a vertical drive device for profiling a respective plane of said object.

14. The method of claim 12 wherein said object is rotationally positioned within said primary beam of electromagnetic energy by a rotational drive device for profiling a respective view within a respective plane of said object.

15. The method of claim 12 further comprising the step of transmitting said output signal to a computer for storing said composite profile.

16. The method of claim 12 further comprising the step of determining a perpendicularity of said object.

17. The method of claim 12 further comprising the step of determining a zero reference point for said object.

18. The method of claim 16, where the step of determining the perpendicularity of said object includes:

centering a bottom of said object on the platform of the motion unit; and measuring a displacement from a top-center of the object to a center of the platform, wherein the perpendicularity is determined.

19. The method of claim 17, wherein the step of determining the zero reference point includes:

determining a height of the object prior to disposing said object within the primary laser beam;

moving the platform up to the height of the object; and zeroing a value for vertical motion, wherein a zero reference point for said object is determined.

20. The method of claim 12, wherein the step of vertically and rotationally disposing said object within said primary laser beam includes:

disposing a threaded portion of the object within said primary laser beam at various planes along the threaded portion of the object, wherein dimensional information from the threaded portion is determined.

* * * * *